United States Patent [19]
Mack

[11] 3,910,308
[45] Oct. 7, 1975

[54] SIGNAL HANDLE FOR VALVES

[76] Inventor: Phillip R. Mack, 1011 Reed Ave., San Diego, Calif. 92109

[22] Filed: Nov. 8, 1973

[21] Appl. No.: 414,162

[52] U.S. Cl. .................................. 137/553; 251/81
[51] Int. Cl.² ..................... F16K 31/60; F16K 37/00
[58] Field of Search ........... 251/81, 79, 80; 137/553

[56] References Cited
UNITED STATES PATENTS 2,881,602   4/1959   Baker et al. ...................... 251/81 X
3,441,115   4/1969   Gunther ............................ 251/81 X Primary Examiner—Henry T. Klinksiek
Attorney, Agent, or Firm—William F. Frank

[57] ABSTRACT

A handle assembly secured to a conventional valve stem, provided with indicia to indicate whether or not the valve is opened or closed.

7 Claims, 3 Drawing Figures

U.S. Patent    Oct. 7, 1975    3,910,308
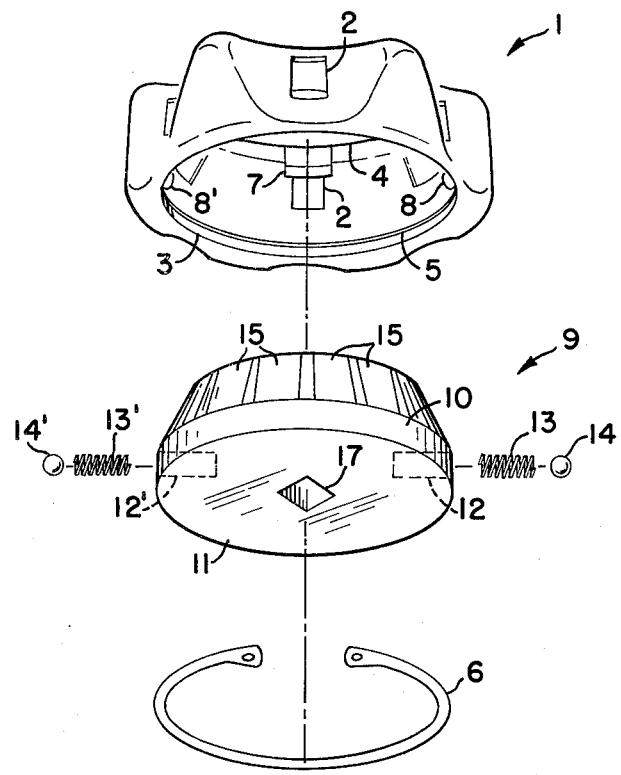
FIG.1
FIG.2
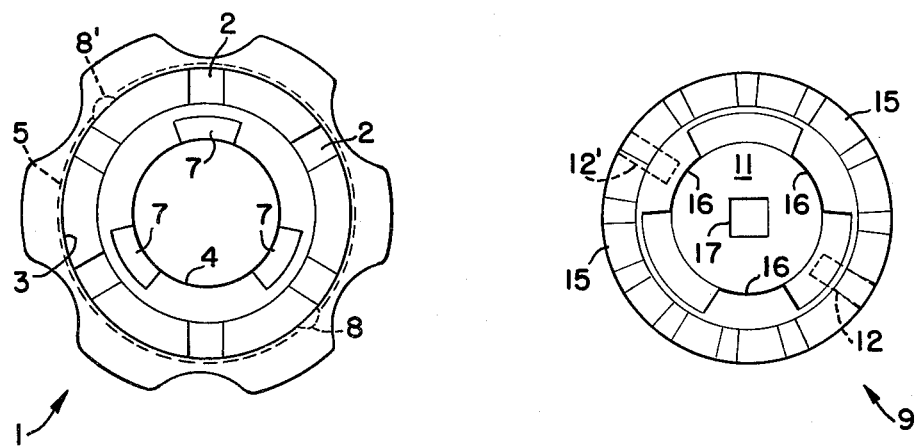
FIG.3

SIGNAL HANDLE FOR VALVES

BACKGROUND OF THE INVENTION

It is often not easy to tell whether or not a valve is open and therefore whether or not valuable or dangerous substances are flowing through conduits connected to the valve. Most conventional valve assemblies require close examination or manual testing to determine if the valve is opened or closed. Because such scrutiny is usually required, costly oversights are not uncommon. Sometimes harmful or expensive gases of liquids escape unnoticed until after damage is done or expensive fluids have escaped.

Although attempts have been made to cope with the problem the prior art shows that most valve position indicia devices are integrated with the body portions of the valve assembly and therefore lack desirable adaptability to the great variety of valves in common use. Until my invention was made there has been no truly universal valve handle components assembled for use in almost all types of valves.

Summary of the Invention

My invention comprises handle components which are easily connectable to a variety of valve stems whereby anyone may, at a glance, see from the particular color or other exposed indicia whether or not a valve has been left standing in an opened or closed position. Its outer windowed portion is operatively associated with its inner indicia member for universal application.

BRIEF DESCRIPTION OF DRAWING

In the accompanying drawing:

FIG. 1, is an exploded perspective view of the preferred form of my invention.

FIG. 2, is cross-sectional view of the outer handle portion of my device from the underside thereof.

FIG. 3, is cross-sectional view of the inner indicia member from the top thereof.

DESCRIPTION OF PREFERRED EMBODIMENT

Referring the drawings wherein like numerals represent like parts, reference numeral 1 depicts an outer handle portion 1 preferably provided with a knurled exterior, as illustrated suitable for non-slippage manual gripping. It is substantially a cone section in configuration and is provided with a plurality of orifices or windows 2 in the recesses between the raised portions of the knurls. Its sides are gently tapered so the windows can easily be seen from the side or top thereof. The portion is substantially barreled-out whereby it is a ringed member with the larger circular opening 3 at its base and smaller circular opening 4 at its upper end. A groove 5 may be provided around the inside thereof near the base to retain snap ring 6 therein. Within the upper section of item 1 is stop means 7 being preferably three bosses equally spaced around the inside of the perimeter of opening 4. In addition a plurality, preferably two in number, of detents bearing character numbers 8 and 8' are provided on inner wall of portion 1 near base thereof.

Operatively mounted within portion 1 is my novel indicia member 9. It too is substantially a cone section in configuration and is of proper proportions and size to fit snugly within the inner recessed body of portion 1. Member 9 has a cylindrical lower section 10 and a solid base 11. Within section 10 are a plurality of recesses 12 and 12', preferably two, into which spiral springs 13 and 13' are mounted. Two solid balls 14 and 14', such as small ball bearings contact the otherwise open end of each spring for engagement with the detents. Around the tapered upper face of member 9 are a plurality of marked surfaces 15. These surfaces are preferably of two colors, preferably of red and green alternately. For color blind people they could be marked $o$ and $x$ signaling opened and closed. The number of surfaces are twice that of the windows, for example, six windows in portion 1 may be used with twelve surfaces. For opposing with stop means 7 of portion 1 I have provided abutting means 16 within the upper recessed part of member 9. There are preferably three such abutting means and they and the opposing means 7 are spaced equally around their respective members at spaced intervals equal to the width of each window 2. Valve stem connector 17 completes my invention. Although I have illustrated an orifice of square configuration cut in the center of base 11, those persons skilled in the art may envision many and various means for securing base 11 to the stem of a valve to be operated. For example, for use with certain gases such as acetylene an extension for the recessed handle arrangement may be devised without departing from the scope of my invention.

In operation, the assembly is connected to the valve stem. If the valve is closed one color, preferably green is exposed in the window. This signals the valve is closed. Upon turning the handle (to open the valve) the spring loaded balls 14 and 14' seated in their respective indents, cause the member 9 to turn as a unit with the windowed handle. Seating of the valve will stop rotation of the valve, its stem and member 9 to which it is connected. Continued manual force on the handle will disengage the balls from the indents and permit the handle to continue to move the width of a window, until the described stop means and abutting means make contact. At such point the handle has covered the green color surface and exposed the red color, thusly signalling the valve is open. Upon closing the process is reversed. The ball, when seated, provides proper resistance or drag to insure valve is completely closed before signal is given.

I claim:

1. In a handle for the stem of a valve which simultaneously opens and closes said valve and indicates the open and closed position of said valve, the combination of an outer handle member provided with window means and having an interior recess to receive an inner member bearing indicia visible through said window means and mounted within said outer member and having at least one biased locking member on its outer surface to engage a like number of recesses on the inner wall of said outer member after a limited rotation of said outer member about said inner member whereby the inner and outer members rotate as a unit, means on the inner member for affixing the inner member to the valve stem in non-rotating relationship and abutting means on the inner member engaging stop means on the inner surface of the outer member after said limited rotation whereby said rotation of the outer member will expose, through said window means, one indicia when the valve is open and different indicia when the valve is closed.

2. The assembly according to claim 1 wherein the ratio of indicia to openings is 2:1.

3. The assembly according to claim 2 wherein said indicia comprises a plurality of pairs of two contrasting colors.

4. The assembly according to claim 2 wherein said indicia comprises a plurality of pairs of differing symbols.

5. The assembly according to claim 3 wherein said indicia further comprises a pair of differing symbols imposed upon each pair of colors.

6. The assembly according to claim 1 further comprising means interconnecting said members to secure said inner member within said outer member.

7. A handle assembly attachable to and rotatable with the shaft of a valve to open and close said valve and simultaneously indicate whether the valve is open or closed, the assembly comprising an outer handle portion, an inner handle portion cooperating with said outer portion to turn said shaft and to indicate the open or closed position of the valve, said outer portion having limited independent rotation about said inner portion, said means positionable within said outer portion to secure said inner portion within said outer portion; said outer portion comprising a hollowed out circular form, a plurality of equi-spaced openings through the upright wall of said outer portion, an axial opening in the upper surface of said outer portion to receive at least the end portion of said shaft, the inner upper surface of said outer portion having a plurality of equi-spaced, depending stop means thereon and a plurality of equi-spaced arcuate recesses formed in the lower portion of the inner wall of said outer portion; said inner handle portion comprising a circular form fittedly matching the inner surface of said outer handle portion, a plurality of indicia on the outer surface of said inner portion in matching engagement with said openings in said outer portion, an axial opening in said inner portion to receive at least the end portion of said shaft in non-rotating engagement therewith, a plurality of abutments formed in the upper surface of said inner portion to intermesh with the stop means in the outer portion, the spacing between said abutments being greater than the length of said stop means to provide said independent rotation whereby the said independent rotation will change said indicia visible in said openings, and a plurality of equi-spaced biased detents in the outer surface of said inner portion in matching position with said arcuate recesses to lock said outer portion to said inner portion after said independent rotation to rotate said shaft.

* * * * *